United States Patent
Malthe et al.

(10) Patent No.: US 8,073,502 B2
(45) Date of Patent: Dec. 6, 2011

(54) HINGED PORTABLE RADIO COMMUNICATION EQUIPMENT WITH A DOUBLE ACTION HINGE

(75) Inventors: Anders Per Malthe, Bjarred (SE); Nils Risberg, Oxie (SE)

(73) Assignee: Sony Ericsson Mobile Communications AB, Lund (SE)

( * ) Notice: Subject to any disclaimer, the term of this patent is extended or adjusted under 35 U.S.C. 154(b) by 888 days.

(21) Appl. No.: 11/908,705

(22) PCT Filed: Feb. 21, 2006

(86) PCT No.: PCT/EP2006/001684
§ 371 (c)(1),
(2), (4) Date: Apr. 21, 2008

(87) PCT Pub. No.: WO2006/097186
PCT Pub. Date: Sep. 21, 2006

(65) Prior Publication Data
US 2009/0011802 A1   Jan. 8, 2009

Related U.S. Application Data

(60) Provisional application No. 60/668,334, filed on Apr. 5, 2005.

(30) Foreign Application Priority Data

Mar. 18, 2005 (EP) .................................. 05388023

(51) Int. Cl.
*H04M 1/00* (2006.01)

(52) U.S. Cl. ............... 455/575.1; 455/575.3; 455/575.4; 455/575.8; 455/550.1; 248/292.14; 248/292.13; 248/296.1; 248/295.11; 361/679.27; 361/679.06; 361/679.08; 361/679.12

(58) Field of Classification Search ............... 455/575.1, 455/575.3, 575.4, 575.8, 550.1; 248/292.14, 248/292.13, 296.1, 295.11, 298.31; 361/679.01–679.1, 279.27
See application file for complete search history.

(56) References Cited

U.S. PATENT DOCUMENTS

2003/0125081 A1   7/2003   Boesen .................... 455/556

FOREIGN PATENT DOCUMENTS

| EP | 0 807 879 | 11/1997 |
|----|-----------|---------|
| EP | 1 217 501 | 6/2002 |
| EP | 1 469 656 | 10/2004 |
| GB | 2 347 577 | 9/2000 |
| JP | 3278212 A | 12/1991 |
| JP | 5-173668 A | 7/1993 |
| JP | 7056653 A | 3/1995 |
| JP | 7064916 A | 3/1995 |
| JP | 9044098 A | 2/1997 |
| JP | 2004-4235687 A | 8/2004 |
| RU | 94037811 A1 | 5/1996 |

*Primary Examiner* — Kamran Afshar
*Assistant Examiner* — Dung Lam
(74) *Attorney, Agent, or Firm* — Myers Bigel Sibley & Sajovec

(57) ABSTRACT

A portable radio communication equipment includes an upper cover part, a lower cover part, a first set of elongate arms having first ends and second ends, said first ends being connected to said upper part by a first set of joints and said second ends being connected to said lower part by a second set of joints. The equipment may include a second set of arms having first ends and second ends, said first ends being connected to said upper part by a third set of joints, and said second ends being connected to said lower part by a fourth set of joints, wherein said joints provide at least three axes of rotation between said arms and said cover parts.

8 Claims, 5 Drawing Sheets

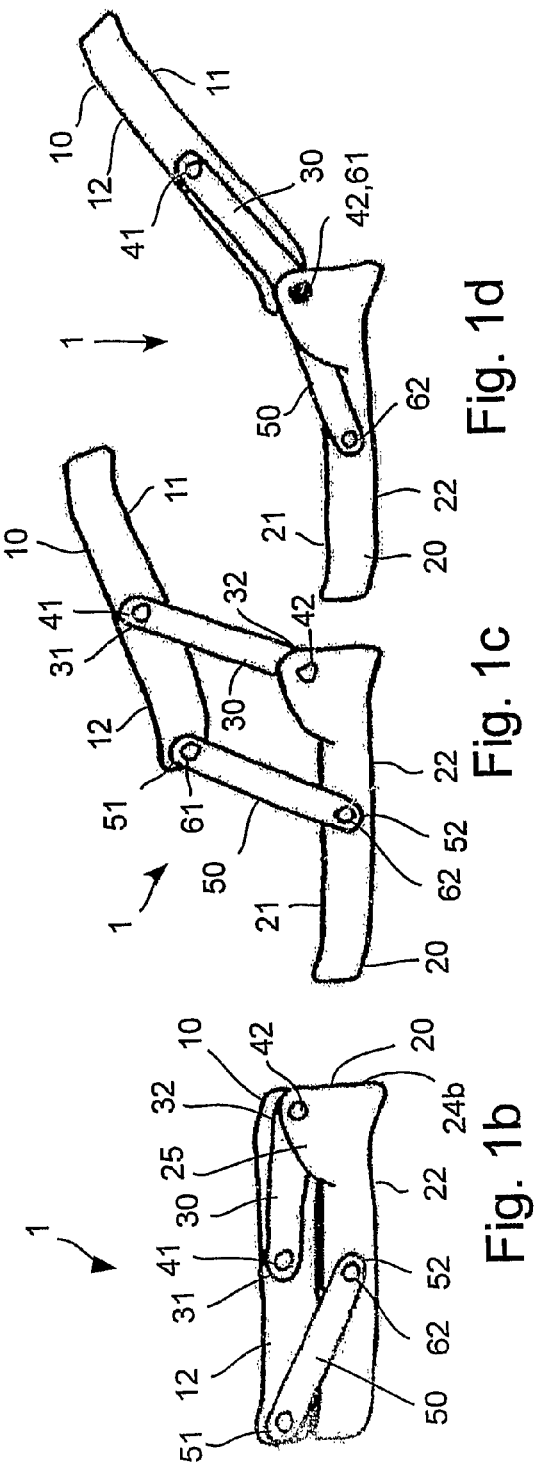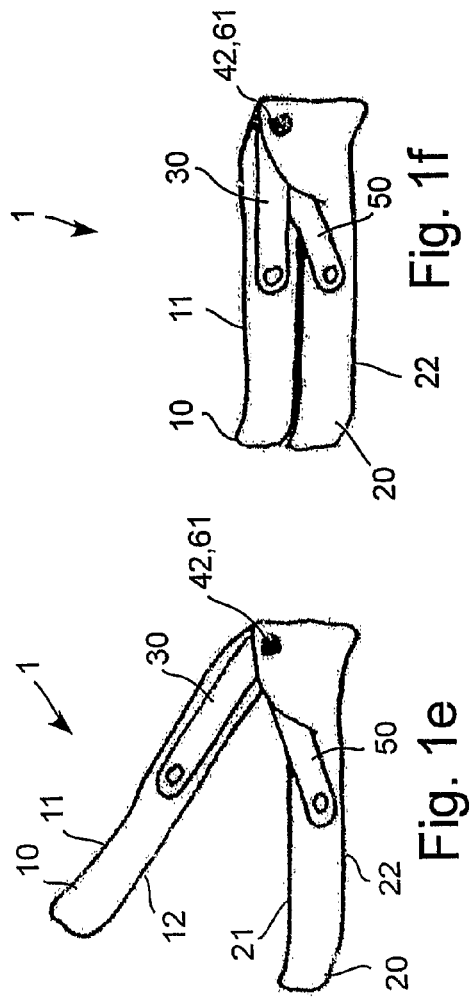

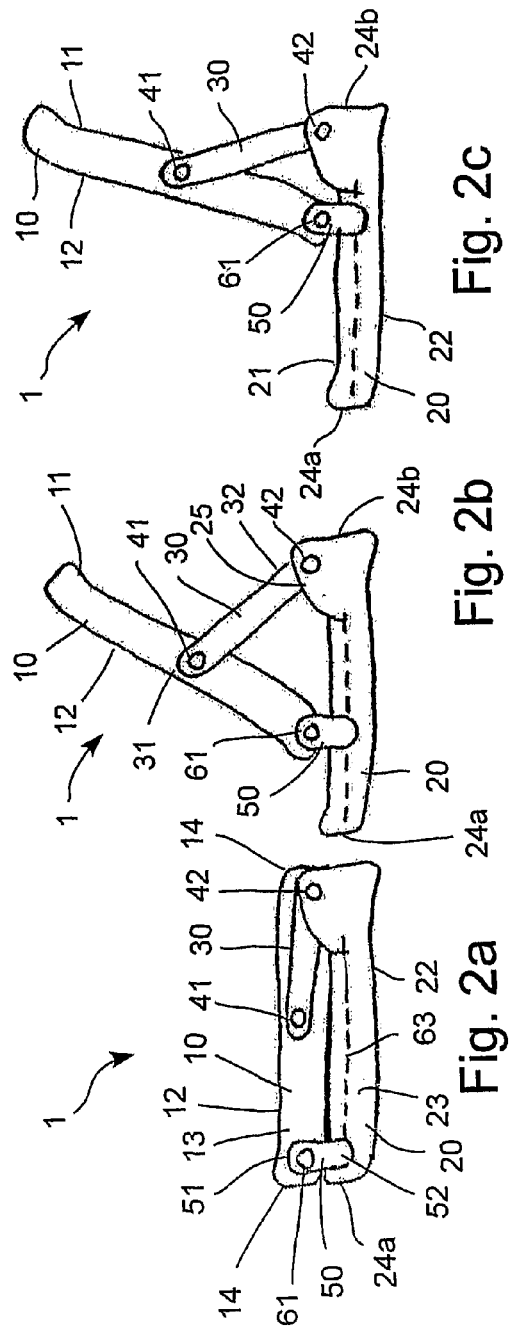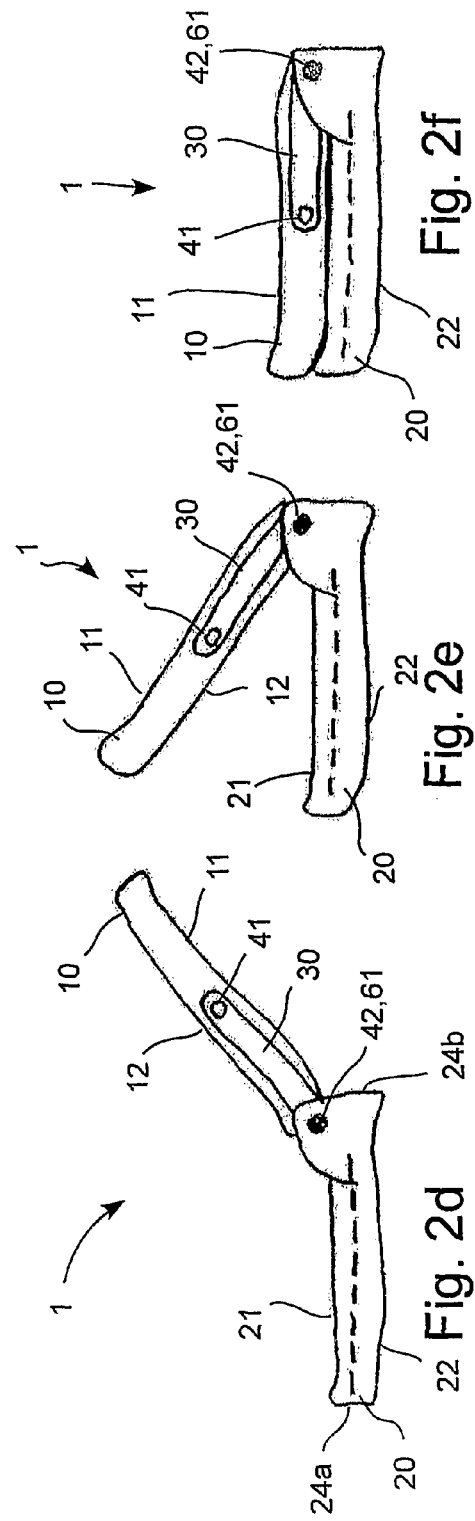

HINGED PORTABLE RADIO COMMUNICATION EQUIPMENT WITH A DOUBLE ACTION HINGE

RELATED APPLICATIONS

The present application is a 35 U.S.C. §371 national phase application of PCT International Application No. PCT/EP2006/001684, having an international filing date of Feb. 21, 2006 and claiming priority to European Patent Application No. 05388023.3 filed Mar. 18, 2005 and U.S. Provisional Application No. 60/668,334 filed Apr. 5, 2005, the disclosures of which are incorporated herein by reference in their entireties. The above PCT International Application was published in the English language and has International Publication No. WO 2006/097186.

TECHNICAL FIELD

The invention relates to a hinged portable radio communication equipment.

RELATED PRIOR ART

Portable radio communication equipment becomes increasingly complex, including an ever increasing number of functionalities, requiring space and openings in the cover of the portable radio communication equipment, for gadgets e.g. cameras, displays, key pads, buttons, communication ports, sensors and lenses. Consequently, the need for an increased functional, i.e. accessible, surface area of the portable radio communication equipment is evident. At the same time the devices need to be as compact as possible.

Therefore, the use of hinged portable radio communication equipment is widely used, e.g. of the clamshell type consisting of two hinged cover parts, openable like a clamshell. Such equipment typically has a main display in one part and a main key pad in the other part on the inside of the "clamshell", such that the device needs to be opened in order to operate its main functionalities.

However, due to the increasing number of functionalities, e.g. additional displays and key pads, or camera lenses needs to be arranged on surfaces that are turned outward when the device is in closed position. When the equipment is in opened position these functionalities thus appear on the "back side" of the device, and consequently can only be serviced/accessed by turning the device, thus loosing control over the functionalities on the "inside" of the device.

Also known in the art is the jackknife-type of portable radio communication equipment, which also comprises two cover parts, that are overlapping each other when in the closed position, and that are opened by turning the cover parts sideways i.e. in a plane parallel to the front surface of the device, by turning the cover parts with relations to each other about a joint having a single common axis of rotation. When turning the cover parts of such a device in relation to each other the functional features on the foremost surface will appear upside down. All the buttons, connectors or other features will thus be in different positions when the cover parts are in the open and closed position respectively. This makes it difficult to place vital features, buttons or attached accessories at the side or bottom surfaces of the equipment. Further the parts are partially overlapping each other, where the parts are rotationally connected. The parts of the surfaces that overlaps cannot be used, which limits the useful surface of the equipment.

Also known in the art is a portable radio communication equipment with two cover parts, rotationally hinged like a traditional clamshell type device around a first axis of rotation, the hinge further having a second axis of rotation perpendicular to the first axis of rotation and parallel to a longitudinal axis of the unfolded device. Such a device is known from the European patent application EP 1 469 656 A2. This hinge is not very stable, and when turning the upper cover part around the second axis of rotation there is a risk of turning the cover part more than 180°, since there is no straightforward indicator of which way to turn. Thus there is a risk of turning such that an electrical connection is torn.

Also known in the art is a hinged portable radio communication equipment published by Sony Ericsson in which two cover parts—an upper and a lower part—are connected to each other by a set of two arms, each rotationally connected to each of the cover parts, on opposite side surfaces of the cover parts. With this hinge the upper cover part can be rotated freely with respect to the lower part. However, in this device the arms must be connected to each other through the cover parts, such that both arms simultaneously obtain the same angle with respect to each cover part at all times, in order to avoid twisting of the hinge between the parts. Such twisting is undesirable because it may damage electrical connections between the cover parts arranged through the arms, or may damage the hinge itself. The connection between the set of arms will take up a considerable amount of space within the cover parts witch is undesirable, because this compromises the compactness of the equipment. If the connection is left out the equipment is unstable, because the hinge between the cover parts is allowed to twist, unless very heavy materials are used for the parts constituting the hinge. Furthermore, because of the electrical connections arranged through the arms, the arms and/or the cover parts must be provided with stop means to avoid unlimited rotation of a cover part in relation to the arms. Otherwise the electrical connections will eventually be torn. However, due to the arrangement of the arms such stop means can too easily be overcome and the correct rotational position of a cover part with respect to the arms may not be determined, without disassembling the device.

OBJECT OF THE INVENTION

The object of the inventions is to provide a hinged portable radio communication equipment that solves the problems of the prior art.

It is an object of the invention to provide a compact hinged portable radio communication equipment which provides easy access to all surfaces of the equipment, and combinations of surfaces of the equipment, without having to turn the portable radio communication equipment upside down to get access to the features provided on the surfaces, when holding at least a part of the device in a constant position, in the hand. It is also an object of the invention to provide an equipment allows use of all surfaces for features, functions buttons, and the like.

It is a further object of the invention to provide an alternative hinged portable radio communication equipment.

SUMMARY OF THE INVENTION

The objects of the invention is achieved by a portable radio communication equipment comprising an upper cover part; a lower cover part; a first set of elongate arms having first ends and second ends, said first ends being connected to said upper part by a first set of joints and said second ends being connected to said lower part by a second set of joints, wherein said portable radio communication equipment further comprises a second set of arms having first ends and second ends, said first ends being connected to said upper part by a third set of joints, and said second ends being connected to said lower part by a fourth set of joints, wherein said joints provides at least three axes of rotation between said arms and said cover parts.

Thereby a stable alternative opening mechanism is achieved.

In an embodiment of the invention said axes of rotation of two of said joints can be brought to coincide such that said two joints forms one common axis of rotation.

Thereby it is obtained that the equipment can be operated in two different ways, one way being comparable to the "clamshell", where the two parts are turnable around a single axis of rotation, such that the user get access to two new surfaces of the equipment when it is opened, and one way which is comparable to the "jackknife" type equipment, where the equipment is opened by displacing the two parts with the same surfaces facing the user. Thus the upper part is allowed to be turned in-side-out with respect to the lower part, thus allowing both sides of the upper part to be used as a front, when the equipment is in either of two "closed" positions. Thus the equipment according to the invention is easier to use than prior art devices, and better adapted to the needs and desires of the user.

In a further embodiment of the invention said joints provides four axes of rotation between said arms and said cover parts. Thereby a very stable parallelogram like hinge is obtained having the dual action.

In yet a further embodiment of the invention one set of joints is arranged to allow sliding movement between a cover part and the second set of arms.

It should be emphasized that the term "comprises/comprising" when used in this specification is taken to specify the presence of stated features, integers, steps or components but does not preclude the presence or addition of one or more other features, integers, steps, components or groups thereof.

The term electronic equipment includes portable radio communication equipment. The term portable radio communication equipment, which herein after is referred to as a mobile radio terminal, includes all equipment such as mobile telephones, pagers, communicators, i.e. electronic organizers, smartphones or the like.

DESCRIPTION OF THE DRAWINGS

The invention will be described in detail in the following with reference to the drawings in which

FIGS. 1B-F are side views of the portable radio communication equipment shown in FIG. 1A in different positions;

FIGS. 2A-F are side views of the portable radio communication equipment according to another embodiment of the invention shown in different positions.

FIG. 4 is a perspective view of a connection arm of a second set of elongate arms suitable for the embodiment shown in FIG. 1A-G, including an embodiment of electrical connection means between .

DETAILED DESCRIPTION OF EMBODIMENTS OF THE INVENTION

Figure 1A:
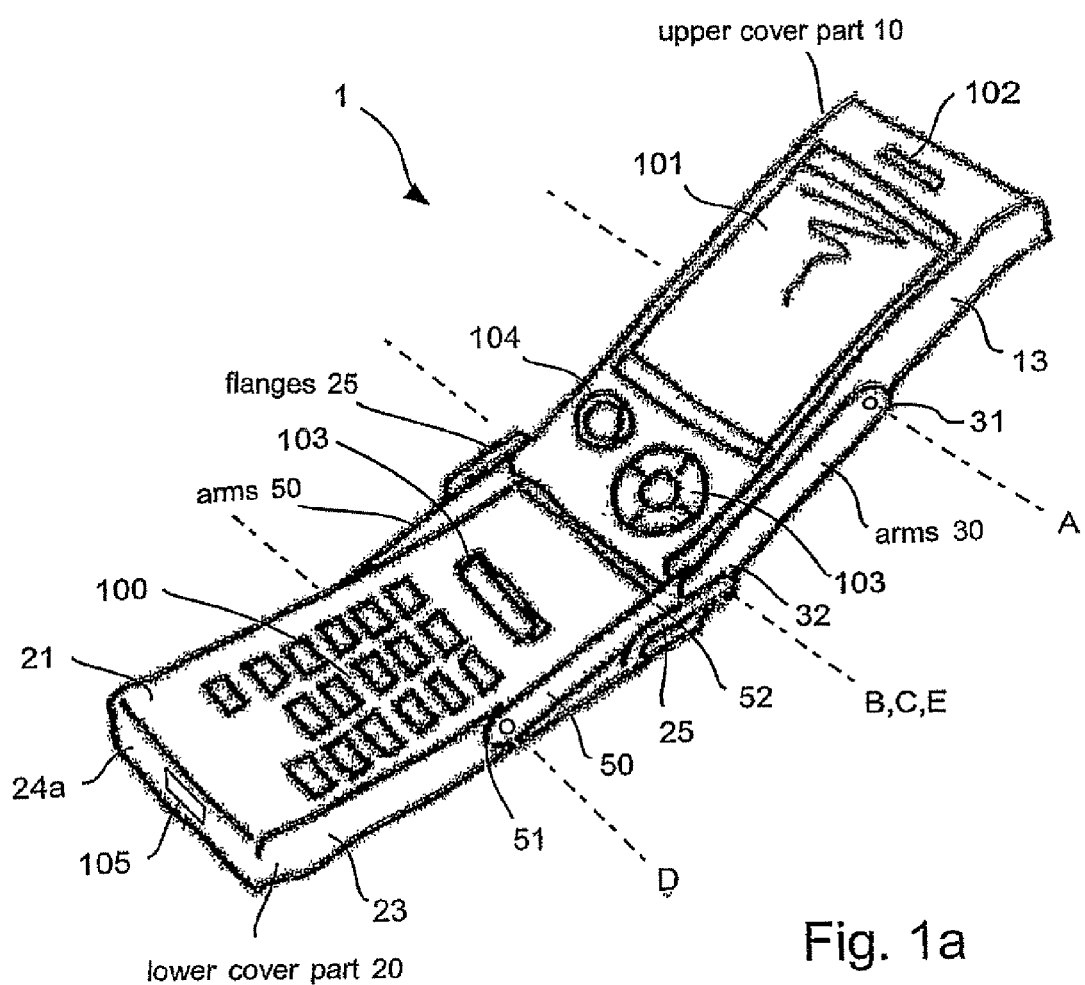
FIG. 1A is a perspective view of a portable radio communication equipment according to one embodiment of the invention, shown in an intermediary position.

Referring firstly to FIG. 1, wherein FIG. 1A shows a perspective view of an embodiment of a portable radio communication equipment 1 according to the invention, the portable radio communication equipment 1 comprises an upper cover part 10 and a lower cover part 20. The lower cover part has a front surface 21, a back surface 22, side surfaces 23 and end surfaces 24. Correspondingly, the upper cover part 10 has a first front surface 11, a second front surface 12, side surfaces 13 and end surfaces 14.

The cover parts 10, 20 are preferably adapted to contain a multitude of electrical components typically mounted on printed circuit boards inside the cover parts 10, 20. Arranged in the outer surfaces of the cover parts 10, 20 a series of communication means are provided in order for a user to control the functioning of the equipment 1. Such communication means typically comprise one or more key pads 100, one or more displays 101, microphones, loudspeakers 102, track buttons, trackballs, joysticks, or other navigation tools 103, function buttons, or cameras 104. These communication means are typically arranged in the front surface 21 of the lower cover part 20, and/or in the first and second front surfaces 11, 12 of the upper cover part 10. System connector ports 105 for attaching electrical conduits e.g. for charging batteries or for connecting the portable radio communication equipment 1 to a computer or the like, are typically arranged in an end surface 24 of the lower cover part 20. Other communication means and components can be applied, those mentioned above being only exemplary. Typically the back surface 22 of the lower part is utilized for a lid providing access to a battery and a SIM card inside the cover part 20.

Turning now to FIGS. 1B-F the portable radio communication equipment 1 shown in FIG. 1A has a first set of elongate arms 30, connecting the upper and lower cover parts 10, 20. FIGS. 1B-F shows the portable radio communication equipment 1 in a side view. Thus only one of the two arms in the first set of arms 30 is visible. The second arm of the set can be appreciated from FIG. 1G. In the embodiments shown in the drawings and as preferred, the portable radio communication equipment 1 is equipped with arms on both sides. However, it will be possible to perform the invention with arms on only one side of the device.

The arms 30 are connected to the upper cover part 10 at first ends 31 of the arms 30 by joints 41. Correspondingly the arms 30 are connected to the lower cover part 20 at a second end 32 of the arms 30 by joints 42.

Figure 1G:
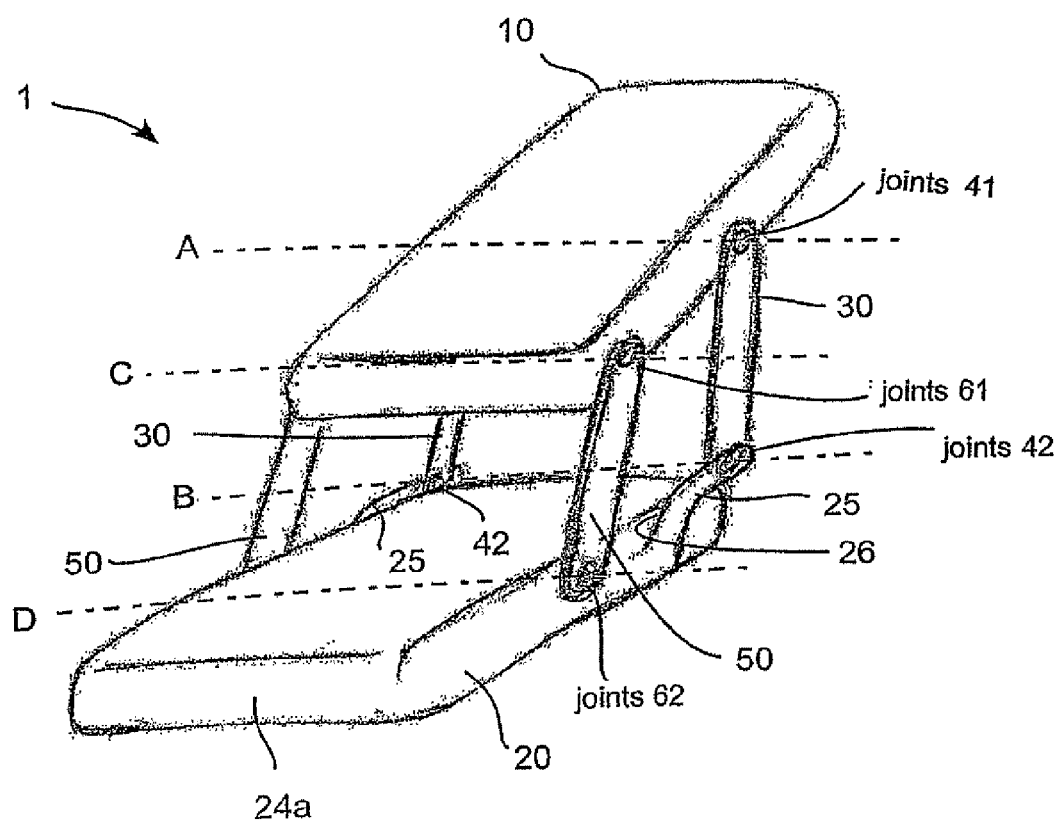
FIG. 1G is another perspective view of the portable radio communication equipment shown in FIG. 1A in a position corresponding to the position shown in FIG. 1C.

The joints 41 are adapted to allow rotation of the arms 30 with respect to the upper cover part 10 about an axis of rotation, A, as can be appreciated by comparing FIGS. 1A and 1G.

The joints 42 are adapted to allow rotation of the arms 30 with respect to the lower cover part 20 about an axis of rotation, B, as can be appreciated by comparing FIGS. 1A and 1G.

Figure 3:
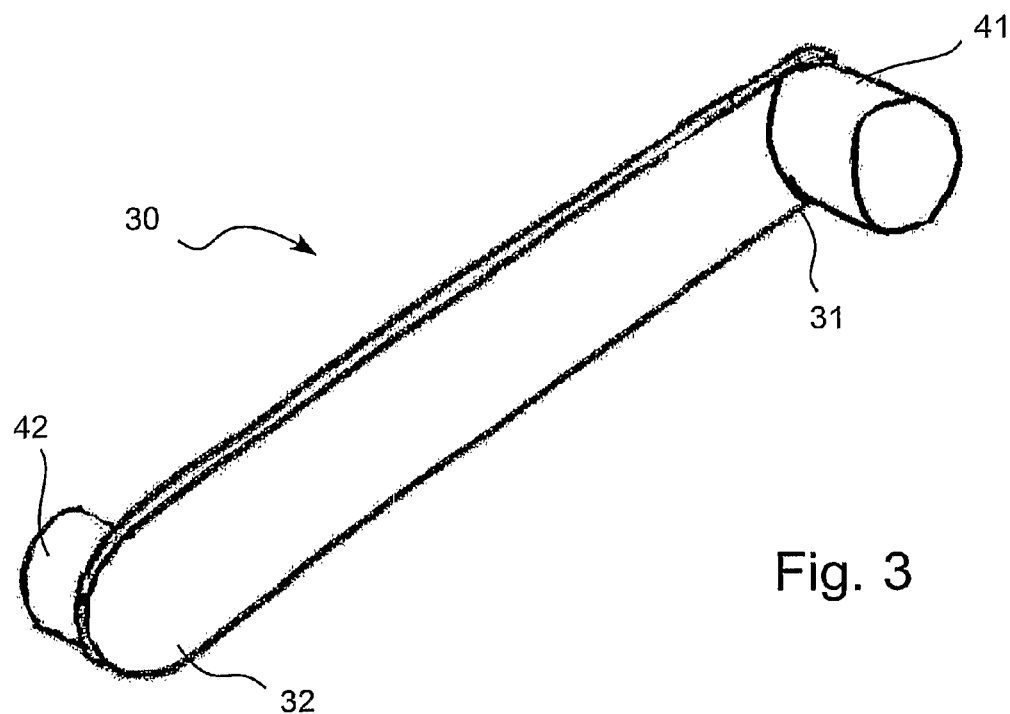
FIG. 3 is a perspective view of an elongate connection arm of a first set of elongate arms suitable for both the embodiment shown in FIGS. 1 and 2.

The joints 41 connecting the upper cover part 10 and the arms 30 are preferably constituted by cylindrical taps on the first ends 31 of the arms 30, as shown in FIG. 3, the taps being adapted for cooperation with circular openings in the upper cover part. Alternatively the taps and openings may change place on the cover part 10 and arms 30.

The joints 42 connecting the lower cover part 10 and the arms 30 are preferably constituted by cylindrical taps on the second ends 32 of the arms 30, adapted for cooperation with circular openings in the upper cover part 20. This opening is arranged in flanges 25 extending from the side surfaces 23 of the lower cover part 20, in such a way that a gap or space 26 is formed between the side surfaces 23. The taps adapted for cooperation with the circular openings in the flanges 25 are thus arranged on the opposite side of the arm 30 relative to the above mentioned taps on the first ends 31 of the arms 30, as shown in FIG. 3. Alternatively the taps and openings may change place on the flanges 25 and arms 30.

The first set of joints 41 connecting the upper cover part 10 and the arms 30 are preferably arranged in a middle section of the side surfaces 13 of the upper cover part 10. The flanges 25 are preferably arranged such that the joints 42 are situated along the side surface 23 of the lower cover part 20 at an end section of said lower cover part 20. However, the joints 42 are preferably elevated such that they are situated above the front surface 21 of the lower cover part 20.

The first set of elongate arms 30 preferably has a length between the joints 41, 42 such that the end surfaces 14, 24 of the lower and upper cover parts 10, 20, respectively, are essentially aligned when the upper and lower cover parts 10, 20 are brought close together, as seen in FIGS. 1B and 1F, the lower and upper part preferably being of essentially the same overall length and width. Thus the length of the set of elongate arms 30 preferably has a length corresponding to approximately ½ the length of a side surface 13, 23 of the upper and lower cover parts 10, 20.

The portable radio communication equipment 1 shown in FIG. 1 further has a second set of elongate arms 50 for connecting the upper and lower cover parts 10, 20. The second set of arms 50, as the first set of arm 30 described above, preferably, comprises one arm on each side 13, 23 of the upper and lower cover parts 10, 20, but may also comprise a single arm situated on one side 13, 23.

The arms 50, shown in FIG. 1 are connected to the upper cover part 10 at first ends 51 of the arms 50 by a third set of joints 61. Correspondingly the arms 50 are connected to the lower cover part 20 at a second end 52 of the arms 50 by a fourth set of joints 62.

The third set of joints 61 are adapted to allow rotation of the arms 50 with respect to the upper cover part 10 about an axis of rotation, C, as can be appreciated by comparing FIGS. 1A and 1G.

The fourth set of joints 62 are adapted to allow rotation of the arms 50 with respect to the lower cover part 20 about an axis of rotation, D, as can be appreciated by comparing FIGS. 1A and 1G.

Figure 4:
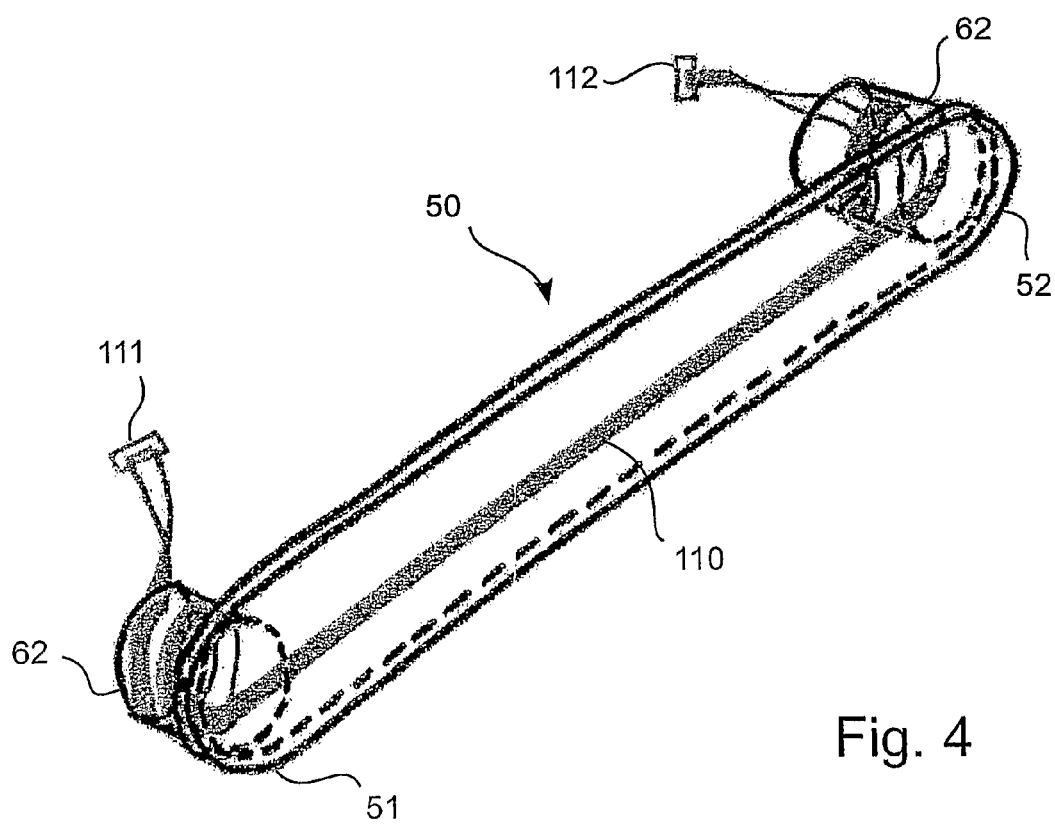

The joints 61 connecting the upper cover part 10 and the arms 50 are preferably constituted by cylindrical taps on the first ends 51 of the arms 50, as can be appreciated from FIG. 4, the taps being adapted for cooperation with circular openings in the upper cover part 10. Alternatively the taps and openings may change place on the cover part 10 and arms 50.

Similarly, the joints 62 connecting the lower cover part 20 and the arms 50 are preferably constituted by cylindrical taps on the second ends 52 of the arms 50, as can be appreciated from FIG. 4, the taps being adapted for cooperation with circular openings in the upper lower part 20. Alternatively the taps and openings may change place on the cover part 20 and arms 50.

The third set of joints 61 connecting the upper cover part 10 and the arms 50 are preferably arranged in a section of the side surfaces 13 near an end surface 14 of the upper cover part 10.

The fourth set of joints 62 connecting the lower cover part 20 and the arms 50 are preferably arranged in a middle section of the side surfaces 23 of the lower cover part 20.

The second set of elongate arms 50 preferably has a length between the joints 61, 62 such that the end surfaces 14, 24 of the lower and upper cover parts 10, 20, respectively, are essentially aligned when the upper and lower cover parts 10, 20 are brought close together, as seen in FIGS. 1B and 1F. The length of the set of the second set of elongate arms 50 preferably has a length corresponding to approximately ½ the length of a side surface 13, 23 of the upper and lower cover parts 10, 20, and is thus preferably of approximately of the same length as the first set of arms 30.

In the following the functioning of the portable radio communication equipment 1 will be explained. In FIG. 1B the portable radio communication equipment 1 is shown in one closed position, the back surface 22 of the lower cover part 20 facing downwards, and the second front surface 12 of the upper part 10 facing upwards. The front surface 21 of the lower part 20, and the first front surface 11 of the upper part are facing each other between the cover parts in this position, concealed from the user. In this position only the functional features of the second front surface 12 are available to the user.

By pushing the upper cover part 10 towards the right and upwards (as seen in FIGS. 1B and C) a clockwards movement of both sets the arms 30, 50 about axes B and D defined by joints 42 and 62, respectively, is initiated towards a position as shown in FIG. 1D. In addition to the second front surface 12 of the upper part 10 the front surface of the lower cover part 20 is made available to the user in this position. This movement pattern could be described as a Z-like movement because the front surface 21 of the lower part 20 and the second front surface 12 of the upper part 10 and are kept essentially parallel or at least facing in the same direction (upwards) during this pattern of movement.

By continuing the movement of the upper cover part 10 to the right with respect to the lower cover part 20, the portable radio communication equipment 1 can be brought into the position shown in FIG. 1D, which could be described as an intermediary position. In this position the axis of rotation C of the joints 61 between the second set of arms 50 and the upper cover part 10 is brought into alignment with the axis of rotation B of the joint 42 between the lower cover part 20 and the first set of arms 30. The Second set of arms 50 passes into the spaces 26 between the side surfaces 23 of the lower cover part 20 and the flanges 25.

When the upper and lower cover parts 10, 20 are in the intermediary position shown in FIG. 1D the portable radio communication equipment 1 can now be operated like a clamshell type of device, as shown in FIGS. 1E and F, due to the alignment of the axis of rotation C of the joints 61 between the second set of arms 50 and the upper cover part 10, and the axis of rotation B of the joint 42 between the lower cover part 20 and the first set of arms 30, thus forming a common axis of rotation, E, for the two joints 42, 61, as shown in FIG. 1A.

By turning the upper cover part 10 in a counter clockwise direction with respect to the common axis of rotation E, (when the portable radio communication equipment 1 is positioned as shown in FIG. 1D) the portable radio communication equipment 1 can be moved into a second closed position as shown in FIG. 1F, passing through the position shown in FIG. 1E. In the second closed position the functions of the first front surface 11 of the upper part is available to the user.

Thus, the two set of arms 30, 50 works like two independent hinges combined to create the possibility for two different motion patterns. The two hinges interact in a middle position, where they are coupled together in a common turning point.

With the dual motion hinge, a portable radio communication equipment 1, is allowed extreme positions, where the upper cover part 10 can be turned up-side-down with respect to the stationary held lower cover part 20. Both sides of the upper cover part 10 can thus be turned outwards and used for user input/output.

Since the hinges are attached to both cover parts 10, 20 during the complete set of movement patterns, the upper and lower cover parts 10, 20 continuously can be electrically and mechanically connected.

As shown in FIG. 4, in this embodiment, an electronic connection 110 may be provided in one or both arms of the second set of elongate arms 50 for transferring data and/or power from one cover part to the other. The electronic connection 110 comprises a set of electronic conduits preferably formed in a cable, stretching inside the elongate arms 50. In each of the ends 51, 52 of the elongate arms 50 the cable runs into the cylindrical taps forming part of joints 61, 62, the cable be wound once or twice on the inside of the taps before exiting through the base of the cylindrical tap, into connectors 111, 112 formed at each end of the electronic connection 110. The connectors 111, 112 formed at each end allow for easy connection to the relevant parts of each cover part 10, 20, respectively.

Due to the arrangement of the two set of arms a natural stop is formed, allowing the upper cover part 10 to rotated or flipped just once, with respect to the lower part 20. Thus the electrical connection is secured from being torn, by being twisted multiple rounds.

In another embodiment, and as shown in FIG. 2, the second set of elongate arms 50 are rotationally connected to the upper cover part 10 as described above, and slideably connected to the lower part 20. Since numerous elements shown in FIG. 1 can also be found in FIG. 2 the same reference numerals are used for the same parts, even if they differ in details. Elements of the portable radio communication equipment 1 that are also found in FIG. 1 will not be described further. The sliding connections between the arms 50 and the lower cover part 20 are formed by joints 62 allowing sliding motion of the arms 50 along a longitudinal axis of the side surface 23 of the portable radio communication equipment 1. These joints 62 are formed by sliding means on the elongate arms 50 and elongate sliding means 63 on the lower cover part 20. The joints 62 may preferably be formed such that the sliding means on the elongate arms are provided by taps extending into elongate slots constituting the elongate sliding means 63 on the lower cover part 20, the elongate slot being formed in and along the side surfaces 23 of the portable radio communication equipment 1. Alternatively, the joint 62 may be formed by a rail on and along one or both side surfaces 23, e.g. having a T-shape, the arm 50 having means to grip the rail, e.g. a U-shaped grip. Alternatively, the elongate sliding means 63 may be formed on or in an edge between the side surface 23 and the front surface 21, or in or on the front surface 22 of the portable radio communication equipment 1.

The length of the arms in the second set of arms 50 in this embodiment is such that the axis of rotation C of joint 61 is at the same distance over the front surface 21 as the axis of rotation B of joint 42, as described above. However, the axis of rotation C does not necessarily have to have the same distance over the front surface 21 as the axis of rotation B. The movement must however end at a point, where the distance is correct and enables the common axis of rotation E.

The joints 62 between the second set of elongate arms 50 and the lower cover part 20 are preferably configured such that the rotatable joint 61 between the second set of arms 50 and the upper part 10 can be translated from a position at one end surface 24a to position at a second end surface 24b of the portable radio communication equipment 1, as shown in FIGS. 2A-D, such that, at a position at one end surface 24b the axis of rotation C of joint 61 is brought to coincide with the axis of rotation B of joint 42. The flange 25 is in this embodiment configured such that the arms 50 or at least parts thereof are allowed slide inside the flange 25 in a gap or space 26 formed between the side surfaces 23 and the flange 25 on each side, in order for allowing the joints 61, 42 to coincide.

In the position shown in FIG. 2A access to the second front surface 12 is provided to the user. By sliding the upper cover part 10 towards the right (as shown in FIGS. 2B and 2C the upper cover part 10 will start to turn and provide access to a combination of the second front surface 12 of the upper cover part 10 and the front surface of the lower part 20, as shown in FIGS. 2B, 2C, and 2D. Full access is provide to the user to these two surfaces when the upper and lower cover parts 30, 50 are in the intermediary position shown in FIG. 2D.

When, as shown in FIG. 2D the axis of rotation C of joint 61 is brought to coincide with the axis of rotation B of joint 42, the portable radio communication equipment, may function as a clamshell-type device, such that the upper part can be rotated about a common axis of rotation as shown in FIG. 2E in a counterclockwise direction until the closed position shown in FIG. 2F has been reached. In this position access is provided to the first front surface 11 of the upper cover part.

In this embodiment the necessary electrical connection are preferably made through one or both arms in the first set of arms 30, in a manner corresponding to what is described above in relation to FIG. 3. In this case the electrical connection, however, will be brought to pass through the base of the cylindrical tap on one side of the arm 30 in one end of the arm 30, and on the opposite side of the arm 30 on the other end of the arm 30, and further through the flanges 25 of the lower part.

Thus, both the above described embodiments can be seen as having two combined hinges, having either all fixed turning points or a combination of fixed turning points and a sliding connection. In both cases the two hinges interact with a common turning point in an intermediary position, creating a transition between the two individual movement patterns.

The arms 30, 50 may be formed in any suitable material, such as a polymer or a metal, e.g. aluminum or steel.

As an alternative or addition to the electrical connection between the upper and lower parts described above, communication between the two parts can be provided by an optical connection or a radio link, such as Bluetooth.

The back or lower side 22 of the bottom part 20 of the equipment 1 discussed above may of course be utilized for placing features/functions, buttons, and/or cameras as well, as in the prior art, although access to these features will not be possible without turning the entire equipment.

The invention claimed is:

1. A portable radio communication equipment comprising;
   an upper cover part;
   a lower cover part;
   a first set of elongate arms having first ends and second ends; and
   a second set of arms having first ends and second ends, said first ends of said first set of elongate arms being connected to said upper cover part by a first set of joints and said second ends of said first set of elongate arms being connected to said lower cover part by a second set of joints, and said first ends of said second set of arms being connected to said upper cover part by a third set of joints, and said second ends of said second set of arms being connected to said lower cover part by a fourth set of joints, wherein said joints provide at least three axes of rotation between said arms and said cover parts, wherein said axes of rotation of two of said sets of the joints are moveable with respect to each other to a position in which the two of said sets of the joints share a common axis of rotation.

2. A portable radio communication equipment according to claim 1, wherein in that the first set of arms are connected to the lower cover part at a point elevated over a front surface of the lower cover part.

3. A portable radio communication equipment according to claim 2, wherein the first set of arms are connected to the lower cover part by flanges arranged parallel to a side surface of said lower cover part, a space being formed between said side surface and said flange.

4. A portable radio communication equipment according to claim 1, wherein said joints provides four axes of rotation between said arms and said cover parts.

5. A portable radio communication equipment according to claim 1, wherein an electrical connection between said upper and lower cover parts is arranged through at least one arm of said second set of arms.

6. A portable radio communication equipment according to claim 1, wherein one set of joints is arranged to allow sliding movement between a cover part and the second set of arms.

7. A portable radio communication equipment according to claim 1, wherein an electrical connection is provided between said cover parts through at least one arm belonging to the first set of arms.

8. A portable radio communication equipment according to claim 1, wherein an electrical connection is provided between said cover parts by an optical connection or a radio link.

* * * * *